Figure 1:
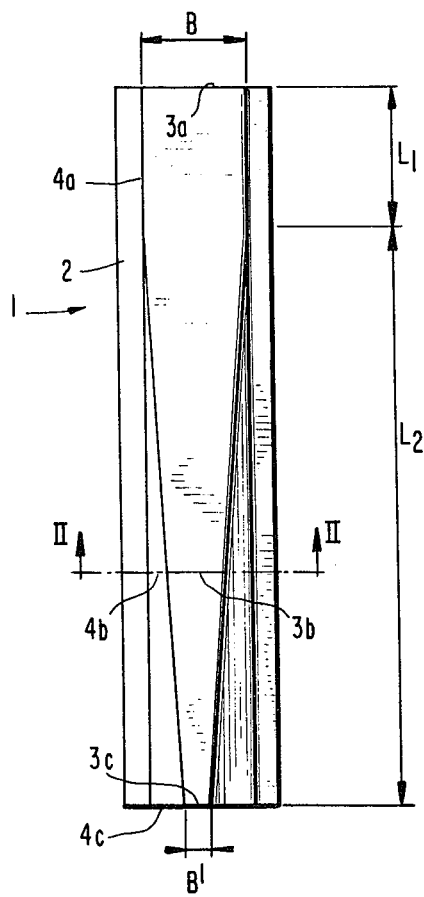

United States Patent [19]

Schaper

[11] 4,095,819
[45] Jun. 20, 1978

[54] LONGITUDINAL BEARER FOR THE CHASSIS OF MOTOR VEHICLES

[75] Inventor: Dieter Schaper, Sindelfingen, Germany

[73] Assignee: Daimler-Benz Aktiengesellschaft, Germany

[21] Appl. No.: 726,444

[22] Filed: Sep. 24, 1976

[30] Foreign Application Priority Data

Sep. 26, 1975 Germany .............................. 2542974

[51] Int. Cl.² .............................................. B62D 21/00
[52] U.S. Cl. .................................... 280/784; 296/28 F
[58] Field of Search ....................... 280/106 R, 106 T; 296/28 R, 28 F

[56] References Cited

U.S. PATENT DOCUMENTS

| | | | |
|---|---|---|---|
| 3,088,502 | 6/1975 | Felzer | 280/106 R |
| 3,851,912 | 12/1974 | Grosseau | 280/106 R |
| 3,912,295 | 10/1975 | Eggert | 280/106 R |

Primary Examiner—Joseph F. Peters, Jr.
Assistant Examiner—John A. Carroll
Attorney, Agent, or Firm—Craig & Antonelli

[57] ABSTRACT

A longitudinal bearer for the chassis of motor vehicles which is formed of symmetrical sheet metal troughs or similar deep-drawn profiles having edges, and which is connected together by flanges projecting out of the approximately rectangular cross section at two opposte sides of the bearer; the width dimensions of the trough bottom walls of the parallelepiped which is assembled from the two sheet metal troughs and forms the bearer are reduced in the longitudinal direction in that the connecting walls between the flanges and the bottom walls extend increasingly inclined to the contours of the parallelepiped and thereby become wider in the mentioned longitudinal direction.

11 Claims, 2 Drawing Figures

U.S. Patent  June 20, 1978  4,095,819

LONGITUDINAL BEARER FOR THE CHASSIS OF MOTOR VEHICLES

The present invention relates to a longitudinal bearer for the chassis of motor vehicles which is formed or mirror-image-like sheet metal troughs or other deep-drawn profiles with edges and which is welded together, riveted together, screwed together or the like by means of flanges projecting at two mutually opposite sides out of approximately rectangular cross section. It is thereby essential that the bearers include longitudinal edges.

Forward or rear longitudinal bearers in motor vehicles are intended to convert energy in case of a front end or rear end impact in that the bearers deform in a controlled, i.e., in a predetermined manner. Rectilinear, smooth longitudinal bearers tend to buckle, as a result of which the energy absorption is strongly reduced. For purposes of achieving a desired, uniform deformation, it has already been proposed to provide circumferential grooves or indentations, corner grooves or indentations, corner apertures or the like in the longitudinal bearers. These measures, however, entailed the disadvantage that not only the energy absorption was strongly reduced but that also the other properties of the longitudinal bearer, such as bending and torsional moment absorption were negatively influenced thereby.

It is the aim of the present invention to so construct the longitudinal bearer that it can be deformed in a buckle-free and controlled manner by a constructive realization without thereby essentially reducing the bending and torsional properties of the bearer. It is also an aim of the present invention to find a shape for the bearer which can be installed into every series-manufactured vehicle without decisive or far-reaching changes.

The underlying problems are solved according to the present invention in that the width dimensions of the trough-bottom walls of the parallelepiped composed of the two sheet metal profiles are narrowed or tapered in the longitudinal direction, and in that the connecting walls between the flanges and the bottom walls of the troughs extend at an ever-greater inclination to the parallelepiped contours, i.e., to their original configuration and thereby become wider in the mentioned longitudinal direction. It is achieved thereby that the corner angles, from the beginning of the tapering (at the rear) up to the respective front become enlarged from $\approx 90°$ to $> 90°$ so that the corner rigidty decreases in the forward direction in order that the deformation, as desired, progesses uniformly from in front toward the rear. The widening of the connecting walls or the narrowing of the bottom walls, however, is to be carried out only so far that the width dimensions of the bottom walls are reduced to a residual size which corresponds to a fraction of its original width. The absolute valve of the fraction controls the progess of the force and therewith the energy absorption. The bearer according to the present invention is best so installed into the motor vehicle that the tapering or narrowing of the trough bottom walls extends opposite the impact direction. This means that with a bearer installed in front of the vehicle, the tapering or narrowing extends toward the front whereas for a bearer installed in the rear of the vehicle, the tapering or narrowing extends rearwardly.

In order to be able to readily connect the bearers according to the present invention in the motor vehicle, they are in an appropriate manner so installed that their flanges extend approximately vertically.

In numerous test-series carried out by applicant, it has been found that the shape of the longitudinal bearer according to the present invention is of equal quality, i.e., equivalent to a non-buckled rectiilinear bearer profile. The cross-sectional area reduction which is realized in accordance with the present invention by the inclination of the connecting walls, by the narrowing of the bottom trough walls and by the angle enlargement resulting therefrom, results in a controlled, uniform deformation of the bearer from in front toward the rear with a high force level. By varying the degree of narrowing or tapering, the deformation and therewith the force fluctuation about the average value can be matched to the respective vehicle conditions. A deterioration of the bending or torsional properties could not be determined with the longitudinal bearer of the present invention. Also, its shape is practical since the bearer can be installed into each series vehicle without decisive changes because the connections fit or can readily be made to fit.

Accordingly, it is an object of the present invention to provide a longitudinal bearer for the chassis of motor vehicles which avoids by simple means the aforementioned shortcomings and drawbacks encountered in the prior art.

Another object of the present invention resides in a longitudinal bearer for the chassis of motor vehicles, which eliminates the buckling tendency, yet does not reduce the energy absorption thereof.

A further object of the present invention resides in a longitudinal bearer of the aforementioned type which improves the uniform deformation of the bearer, without negatively influencing the other properties of the longitudinal bearer such as bending and torsion moment absorption.

Another object of the present invention resides in a longitudinal bearer for chassis of motor vehicles which can be deformed in a controlled manner, yet is simple in construction and can be used without significant changes in each series vehicle.

Still another object of the present invention resides in a longitudinal bearer of the type described above whose shape is practical and permits a ready adaptation to the existing vehicle conditions.

Figure 2:
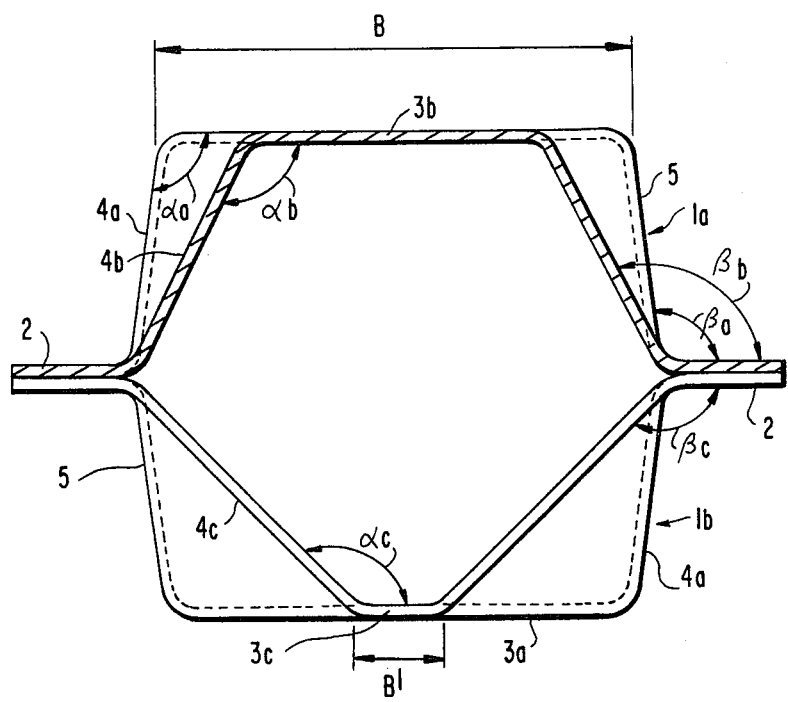

These and other objects, features and advantages of the present invention will become more apparent from the following description when taken in connection with the accompanying drawing which shows, for purposes of illustration only, one embodiment in accordance with the present invention, and wherein:

FIG. 1 is a side elevational view of the longitudinal bearer in accordance with the present invention; and FIG. 2 is an end elevational view, on an enlarged scale compared to FIG. 1, whereby the upper part of the longitudinal bearer is shown in cross section, taken along the line II—II of FIG. 1.

Referring now to the drawing wherein like reference numerals are used throughout the two views to designate like parts, the longitudinal bearer intended for the chassis of motor vehicles is constituted of two symmetrical or mirror-image-like sheet metals troughs generally designated by reference numerals 1a and 1b which are welded together by means of flanges 2 that project out of the approximately rectangular cross section of the longitudinal bearer at two mutually opposite sides thereof. The sheet metal troughs 1a and 1b each include a bottom wall 3 and two connecting walls 4 which extend between the flanges 2 and the respective bottom wall 3. The corner angles α result between the bottom walls 3 and the connecting walls 4 while the corner angles β result between the connecting walls 4 and the flanges 2. The width dimensions B and B' of the trough bottom walls 3 of the parallelepiped assembled of the two sheet metal troughs 1a and 1b now taper or narrow in the longitudinal direction of the bearer in that the connecting walls 4 between the flanges 2 and the bottom walls 3 extend evermore inclined in reference to the upper and lower contour lines 5 and thereby become wider in the longitudinal direction. More particularly, the longitudinal bearer is so installed into the motor vehicle that the place of the greatest narrowing or reduction of the bottom wall 3c is disposed forwardly when installed in the front section of the motor vehicle and the other side of the bearer lies correspondingly toward the rear. With an installation in the rear section of the vehicle, the reverse applies correspondingly.

For purposes of explaining the configuration and course of the connecting walls 4, the same are indicated in dash lines in FIG. 2 for the area 4a over the length $L_1$ which represent the inner surfaces thereof; at the place 4b of FIG. 1, the connecting walls extend as they are shown in cross-section in FIG. 2, taken along the plane II—II of FIG. 1 and as designated by reference numeral 4b. At the place 4c of FIG. 1, i.e., at the exposed end of the bearer, the connecting walls extend as shown in FIG. 2 in elevational view and as designated therein by reference numeral 4c. The corresponding is also true for the course for the narrowing bottom walls 3 which are designated at the corresponding places by reference numerals 3a, 3b and 3c, and also for the corner angles which are designated by $\alpha_a$, $\alpha_b$ and $\alpha_c$ and $\beta_a$, $\beta_b$ and $\beta_c$. The elevation in FIG. 2 shows the bottom walls 3c and the connecting walls 4c at the most forward place of the bearer. The width dimensions of the bottom walls are reduced from the original width B to a residual width B' which corresponds to a fraction of the original width B.

As shown in FIG. 1, the narrowing of the bottom wall 3 which encompasses the area $L_2$ begins, as viewed from the rear, only after about one-sixth $L_1$ of the bearer longitudinal dimension. The ratio of the length of the bearer to its width is about 6 : 1 or 7 : 1. The flanges 2 have a width which corresponds approximately to one-fifth of the width of the longitudinal bearer. The cross-sectional height of the bearer is thereby somewhat greater than its cross-sectional width.

The connecting walls 4 are slighty outwardly curved or arched prior to their enlargement, i.e., within the area 4a, and extend in the direction toward the flanges 2 obliquely to one another with their outer surfaces 5.

The bearer is appropriately installed in the vehicle with vertically extending flanges 2 because in this manner the connections for the fastening of the bearer or for the fastening of parts to be secured at the same can be determined in the most simple manner.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A longitudinal bearer for motor vehicles, comprising two approximately trough-shaped profile means including bottom wall means and connecting wall means as well as flange means, the two profile means being connected together at said flange means, characterized in that the width dimensions of the bottom wall means are reduced in the longitudinal direction and in that the connecting wall means between the flange means and the bottom wall means extend evermore inclined to the contours of the longitudinal bearer and thereby become wider in said longitudinal direction.

2. A longitudinal bearer according to claim 1, characterized in that said two profile means are substantially mirror-image-like.

3. A longitudinal bearer according to claim 2, characterized in that said two profile means form at least approximately a parallelepiped.

4. A longitudinal bearer according to claim 3, characterized in that the profile means are sheet metal profiles having edges projecting out of the aproximately rectangular configuration of the bearer at two mutually opposite sides thereof and forming said flange means.

5. A longitudinal bearer according to claim 4, characterized in that the tapering in the vehicle extends acutely opposite the impact direction so that the narrowest bottom wall dimension exists at the place exposed to the impact.

6. A longitudinal bearer according to claim 5, characterized in that the corner angles of the profile means become larger in the direction opposite to the impact direction.

7. A longitudinal bearer according to claim 6, characterized in that said corner angles include the angles formed between respective connecting wall means and bottom wall means, on the one hand, and between respective connecting wall means and flange means on the other.

8. A longitudinal bearer according to claim 1, characterized in that the tapering in the vehicle extends acutely opposite the impact direction so that the narrowest bottom wall dimension exists at the place exposed to the impact.

9. A longitudinal bearer according to claim 1, characterized in that the corner angles of the profile means become larger in the direction opposite the to impact direction.

10. A longitudinal bearer according to claim 9, characterized in that said corner angles include the angles formed between respective connecting wall means and bottom wall means, on the one hand, and between respective connecting wall means and flange means and flange means on the other.

11. A longitudinal bearer according to claim 1, characterized in that said connecting wall means become wider in said longitudinal direction as the width dimensions of said bottom wall means are reduced.

* * * * *